(12) United States Patent
Chen

(10) Patent No.: US 11,303,799 B2
(45) Date of Patent: Apr. 12, 2022

(54) CONTROL DEVICE AND CONTROL METHOD

(71) Applicant: SONY CORPORATION, Tokyo (JP)

(72) Inventor: Xi Chen, Tokyo (JP)

(73) Assignee: SONY CORPORATION, Tokyo (JP)

(*) Notice: Subject to any disclaimer, the term of this patent is extended or adjusted under 35 U.S.C. 154(b) by 0 days.

(21) Appl. No.: 17/250,422

(22) PCT Filed: Jul. 17, 2019

(86) PCT No.: PCT/JP2019/028008
§ 371 (c)(1),
(2) Date: Jan. 19, 2021

(87) PCT Pub. No.: WO2020/026798
PCT Pub. Date: Feb. 6, 2020

(65) Prior Publication Data
US 2021/0266467 A1    Aug. 26, 2021

(30) Foreign Application Priority Data

Jul. 31, 2018   (JP) .............................. JP2018-143260

(51) Int. Cl.
*H04N 5/232*      (2006.01)
*G05D 1/00*       (2006.01)
*G05D 1/02*       (2020.01)

(52) U.S. Cl.
CPC ..... *H04N 5/232121* (2018.08); *G05D 1/0088* (2013.01); *G05D 1/0219* (2013.01);
(Continued)

(58) Field of Classification Search
CPC ......... H04N 5/232121; H04N 5/23299; H04N 5/23218; G05D 1/0088; G05D 1/0219; G05D 1/0251; G05D 2201/0214
(Continued)

(56) References Cited

U.S. PATENT DOCUMENTS 7,974,460 B2 *  7/2011  Elgersma ................ G06T 7/571
                                                    382/153
9,463,575 B2 * 10/2016  Shimizu ................. B25J 9/1679
(Continued)

FOREIGN PATENT DOCUMENTS

| JP | 2009-177666 A | 8/2009 |
| JP | 2017-200088 A | 11/2017 |
| JP | 2018-049438 A | 3/2018 |

OTHER PUBLICATIONS

International Search Report and Written Opinion of PCT Application No. PCT/JP2019/028008, dated Sep. 10, 2019, 07 pages of ISRWO.

*Primary Examiner* — Pritham D Prabhakher
(74) *Attorney, Agent, or Firm* — Chip Law Group

(57) ABSTRACT

The present technology relates to a control device, a control method, and a program that enable capturing an image suitable for use in image processing such as recognition of a target object. A control device according to an embodiment of the present technology generates a map including a target object existing around a moving object on the basis of output from a sensor provided on the moving object, and controls drive of a camera provided on the moving object that captures an image of the target object on the basis of a relation between a position of the target object and position of the moving object on the map. The present technology can be applied to a robot capable of acting autonomously.

9 Claims, 14 Drawing Sheets

(52) U.S. Cl.
CPC ....... *G05D 1/0251* (2013.01); *H04N 5/23218* (2018.08); *H04N 5/23299* (2018.08); *G05D 2201/0214* (2013.01)

(58) Field of Classification Search
USPC ......................................................... 348/348
See application file for complete search history.

(56) References Cited

U.S. PATENT DOCUMENTS

| | | | | |
|---|---|---|---|---|
| 9,661,215 | B2* | 5/2017 | Sivan | ................ H04N 5/23293 |
| 2008/0189036 | A1* | 8/2008 | Elgersma | ................ G06T 7/571 |
| | | | | 382/153 |
| 2010/0030380 | A1* | 2/2010 | Shah | ..................... G01S 7/4813 |
| | | | | 700/258 |
| 2014/0214208 | A1* | 7/2014 | Shimizu | ................ B25J 9/1697 |
| | | | | 700/259 |
| 2016/0261793 | A1* | 9/2016 | Sivan | ................... H04N 19/597 |
| 2016/0375585 | A1* | 12/2016 | Shimizu | ................ B25J 9/1697 |
| | | | | 700/259 |
| 2017/0374272 | A1* | 12/2017 | Tsuji | ....................... G06T 7/174 |
| 2018/0248710 | A1* | 8/2018 | Yu | ........................ H04L 12/282 |

* cited by examiner

CONTROL DEVICE AND CONTROL METHOD

CROSS REFERENCE TO RELATED APPLICATIONS

This application is a U.S. National Phase of International Patent Application No. PCT/JP2019/028008 filed on Jul. 17, 2019, which claims priority benefit of Japanese Patent Application No. JP 2018-143260 filed in the Japan Patent Office on Jul. 31, 2018. Each of the above-referenced applications is hereby incorporated herein by reference in its entirety.

TECHNICAL FIELD

The present technology relates to a control device, a control method, and a program, and more particularly to a control device, a control method, and a program that enable capturing an image suitable for use in image processing such as recognition of a target object.

BACKGROUND ART

With advances in artificial intelligence (AI), or the like, robots that act autonomously according to a surrounding environment have become widespread.

Such an action by a robot is controlled on the basis of, for example, a result of recognizing an object such as an obstacle in surroundings by analyzing an image captured by a camera, for example.

Patent Document 1 discloses a subject tracking device that determines a subject region on the basis of a defocus amount of each focus detection region and an optical axis vector indicating a change in position of a subject in an image in a depth direction.

CITATION LIST

Patent Document

Patent Document 1: Japanese Patent Application Laid-Open No. 2017-200088

SUMMARY OF THE INVENTION

Problems to be Solved by the Invention

Accuracy of recognizing an object in surroundings depends on quality of an image captured by a camera. Whether or not a subject is in focus at a time of image capturing is one of factors that affect recognition accuracy.

In the technique described in Patent Document 1, it is difficult to identify a subject to be focused in a case where a plurality of subjects at different distances is shown in a captured image.

The present technology has been developed to solve the problems mentioned above, and an object of the present technology is to enable capturing an image suitable for use in image processing such as recognition of a target object.

Solutions to Problems

A control device according to one aspect of the present technology includes a map generation unit that generates a map including a target object existing around a moving object on the basis of output from a sensor provided on the moving object, and a control unit that controls drive of a camera provided on the moving object that captures an image of the target object on the basis of a relation between a position of the target object and position of the moving object on the map.

In one aspect of the present technology, a map including a target object existing around a moving object is generated on the basis of output from a sensor provided on the moving object, and drive of a camera provided on the moving object that captures an image of the target object is controlled on the basis of a relation between a position of the target object and position of the moving object on the map.

Effects of the Invention

According to the present technology, it is possible to capture an image suitable for use in image processing such as recognition of a target object Note that the effects described here are not necessarily limited, and may be any one of the effects described in the present disclosure.

MODE FOR CARRYING OUT THE INVENTION

A mode for carrying out the present technology will be described below. Description will be made in the following order.

1. Camera control using map information
2. Configuration example of robot
3. Operation of robot
4. Modifications <Camera control using map information>

Figure 1A:
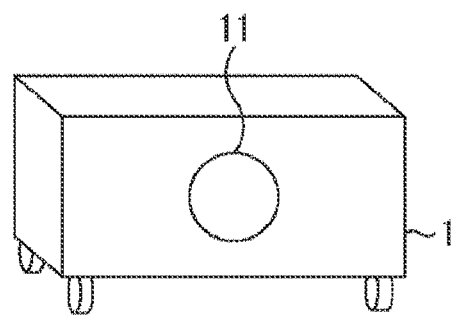
FIGS. 1A and 1B are diagrams illustrating examples of appearance of a robot according to an embodiment of the present technology.
Figure 1B:
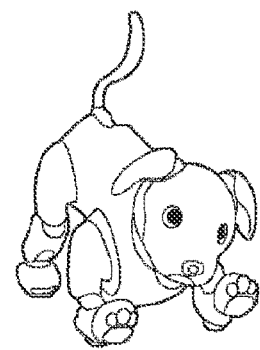

FIGS. 1A and 1B are diagrams illustrating examples of appearance of a robot according to an embodiment of the present technology.

A robot 1 illustrated in FIG. 1A is a moving object capable of moving to an arbitrary position by driving wheels provided on a bottom surface of a box-shaped housing. A camera 11 is provided on a front surface of the housing.

The robot 1 executes a predetermined program with a built-in computer and acts autonomously by driving each part such as the wheels.

Instead of the robot 1, a dog-shaped robot as illustrated in FIG. 1B may be used, or a human-shaped robot capable of bipedal walking may be used. It is possible to allow a moving object of various kinds that can autonomously move, such as a so-called drone, which is an aircraft capable of unmanned flight, to be used instead of the robot 1.

An action by the robot 1 is controlled on the basis of, for example, a recognition result, or the like, based on an image captured by the camera 11. A task of the robot 1 is a task of tracking a specific human, a task of searching surroundings, or the like. These tasks are also tasks that use a recognition result based on an image captured by the camera 11.

For example, the task of tracking a specific human is performed so as to recognize a target human by analyzing an image captured by the camera 11 and tracking the recognized human. Furthermore, the task of searching surroundings is performed so as to recognize an object such as a building or signboard in surroundings by analyzing an image captured by the camera 11.

Accuracy of these tasks depends on showing of a subject in the image captured by the camera 11. For example, in a case where the subject is shown in focus, or in a case where the subject appears large, accuracy of a task is improved by increasing recognition accuracy of the target object.

In the robot 1, various kinds of control of the camera 11 such as focus control (focus control), control of a shooting angle of view, and aperture value control are performed on the basis of map information generated and managed by the robot 1. The camera 11 is a camera equipped with a zoom lens capable of controlling a shooting angle of view by changing focal length.

The robot 1 is equipped with a distance sensor, and map information is generated on the basis of a distance to an object in surroundings detected by the distance sensor. For example, the map information is updated sequentially during execution of a task.

Figure 2:
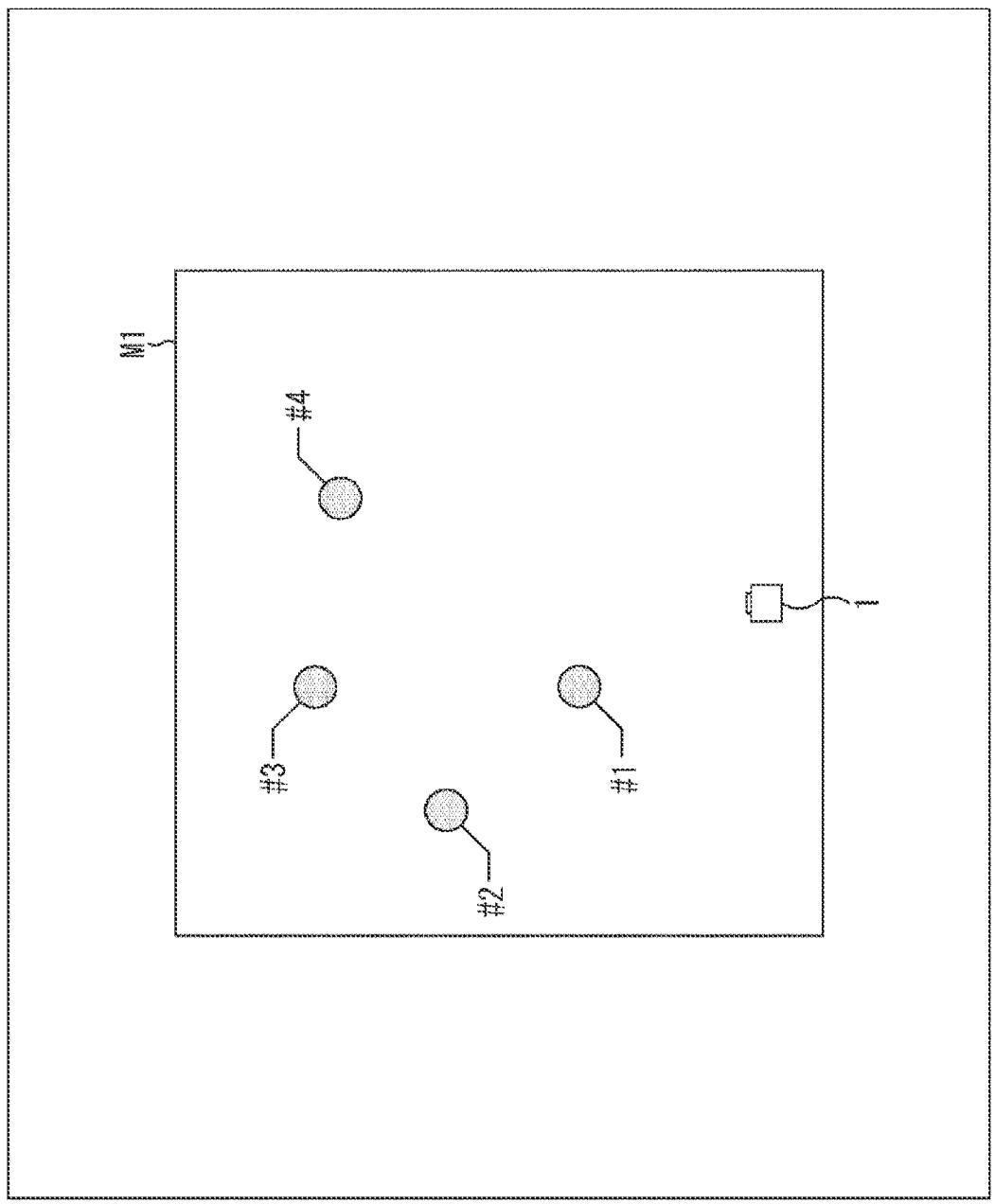
FIG. 2 is a diagram illustrating an example of map information generated by a robot.

FIG. 2 is a diagram illustrating an example of map information generated by the robot 1.

As illustrated in FIG. 2, map information M1 is information in which objects existing around the robot 1 are arranged on a map representing a state in which a predetermined range around the robot 1 is viewed from above. A reference position of the map information M1 is a position of the robot 1.

The map information M1 represents a position, a size, a shape, or the like, of each object around the robot 1.

Furthermore, the map information M1 represents a type of each object around the robot 1. A type of each object around the robot 1 is recognized, for example, by analyzing an image captured by the camera 11, and is associated with an object on a map.

In an example in FIG. 2, it is assumed that there are four humans #1 to #4 in front of the robot 1. For example, the human #1 exists at a position close to the robot 1 as a reference, and the human #4 exists at a position far from the robot 1 as a reference. An object of various kinds other than a human, such as a vehicle, a building, or a sign, is arranged as appropriate on the map information M1.

For example, in a case where a task of tracking a specific human is executed, it is assumed that the human #4 is selected to be tracked.

Figure 3:
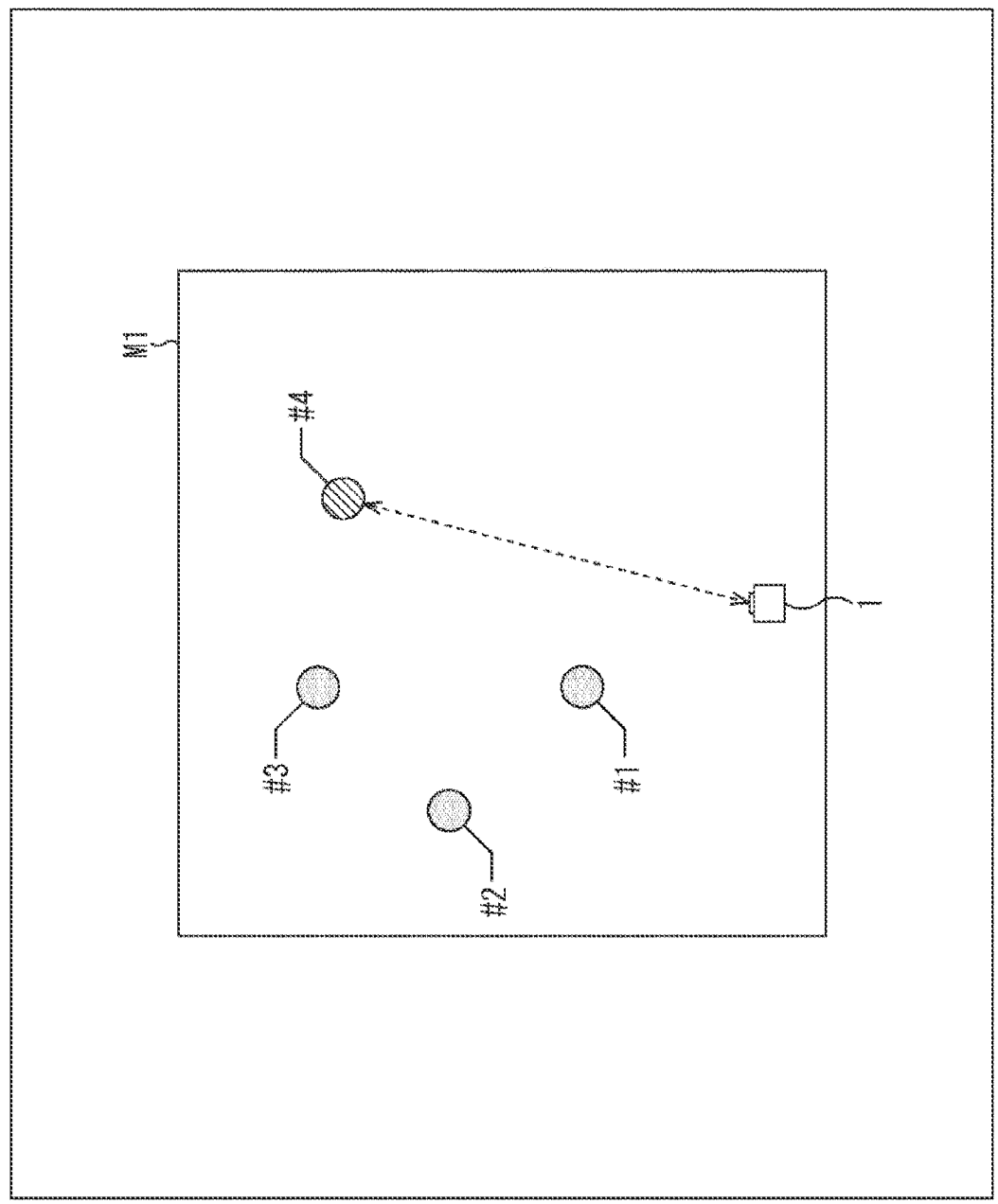
FIG. 3 is a diagram illustrating an example of calculating a distance to a target object.

In this case, in the robot 1, a distance from the robot 1 to the human #4 is calculated on the basis of the map information M1 as illustrated by a dashed arrow in FIG. 3. In the robot 1, focus of the camera 11 is controlled so that the human #4 at a distance calculated on the basis of the map information M1 is in focus.

Figure 4:
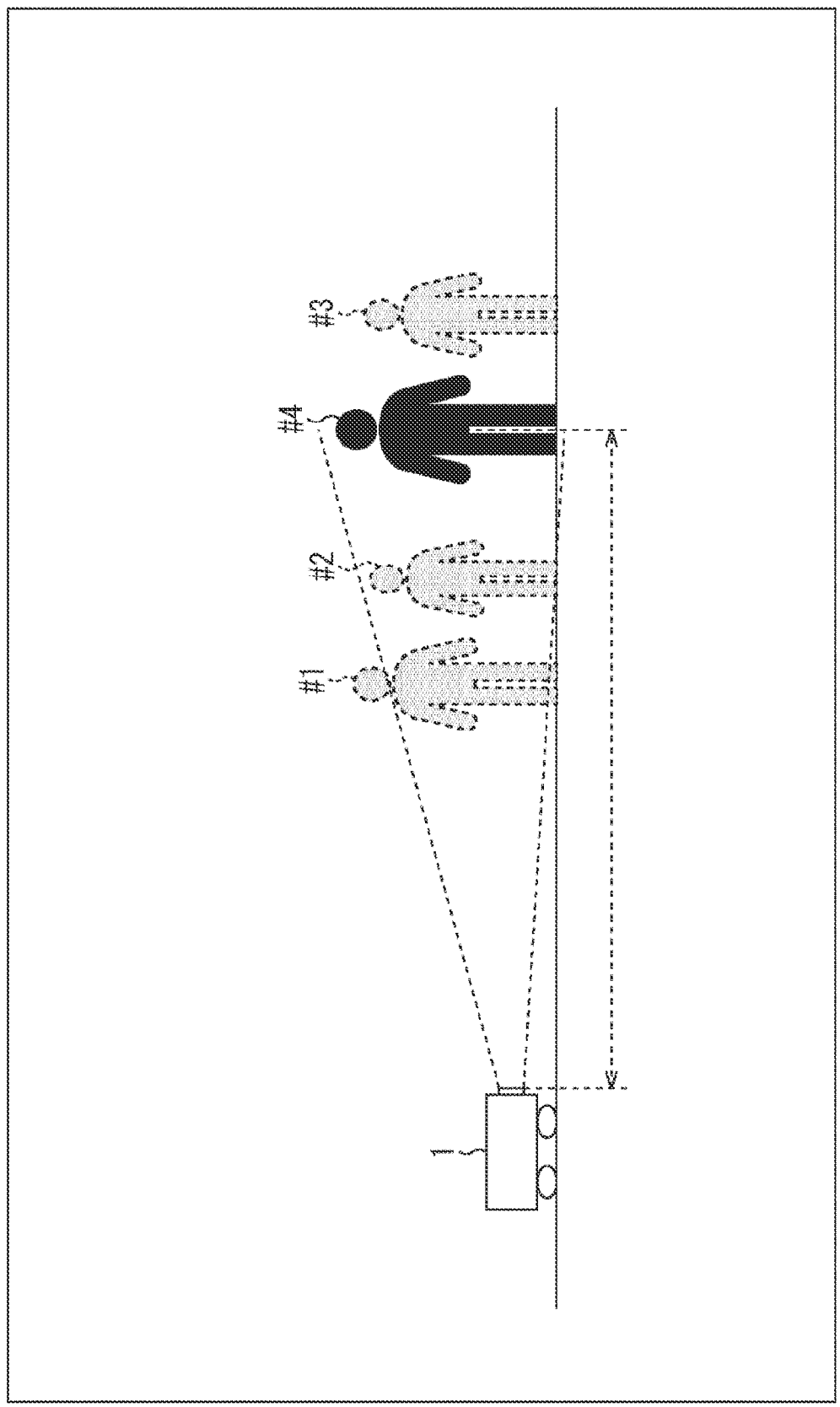
FIG. 4 is a diagram illustrating an example of focus control.

FIG. 4 is a diagram illustrating an example of focus control.

In a case where focus is controlled on the basis of a distance on the map, an image captured by the camera 11 is an image in which the human #4 is in focus, as illustrated in FIG. 4. In FIG. 4, outlining humans other than the human #4 with a dashed line indicates that the humans #1 to #3 are out of focus.

Thus, in the robot 1, the camera 11 is controlled by using so-called simultaneous localization and mapping (SLAM) technology.

By controlling focus on the basis of a distance to a target object calculated by using the map information M1, the robot 1 can capture an image in which the target object is in focus with high accuracy.

Furthermore, because recognition processing is performed on the basis of an image in which a target object is in focus, the robot 1 can recognize the target object with high accuracy, and, on the basis of the recognition result, can perform a task of tracking of a human, or the like, with high accuracy.

In addition to focus control, a shooting angle of view of the camera 11 is controlled on the basis of the distance calculated by using the map information M1.

Figure 5:
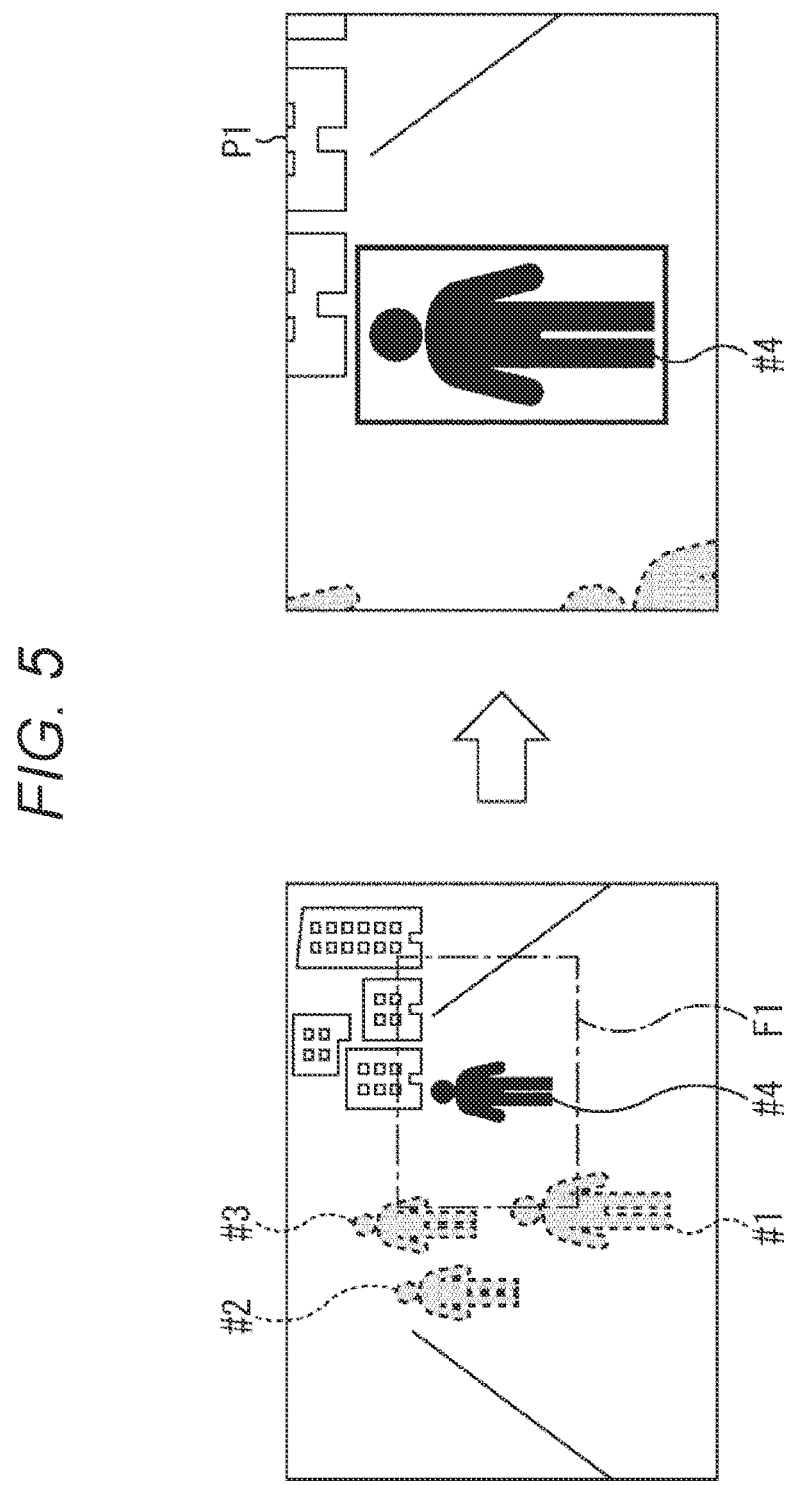
FIG. 5 is a diagram illustrating an example of control of a shooting angle of view.

FIG. 5 is a diagram illustrating an example of control of a shooting angle of view.

A state illustrated on a left side of FIG. 5 illustrates a state in front of the robot 1. The human #4 to be targeted is assumed to be at a position to a right of a center.

In this case, in the robot 1, a shooting angle of view of the camera 11 is controlled so that the human #4 appears large on the basis of the distance calculated by using the map information M1. Position of human #4 is also identified on the basis of the map information M1.

In an example in FIG. 5, zoom operation of a lens mounted on the camera 11 is performed so as to expand a range surrounded by a frame F1 of an alternate long and short dash line. As indicated by a tip of the arrow, a shooting angle of view of an image P1 is such that the human #4 appears large.

In the robot 1, a task such as tracking the human #4, as indicated by being surrounded by a thick line, is performed on the basis of the image P1 in which the human #4 appears large.

Because recognition processing is performed on the basis of an image in which a target object appears large, the robot 1 can recognize the target object with high accuracy, and perform a task with high accuracy.

Thus, in the robot 1, an image in which a target object is in focus and the target object appears large is captured on the basis of a positional relation between the robot 1 and the target object on the map. Capturing an image of such a target object is performed so as to track the target object on the basis of a position of the target object estimated from the map information M1.

Figure 6:
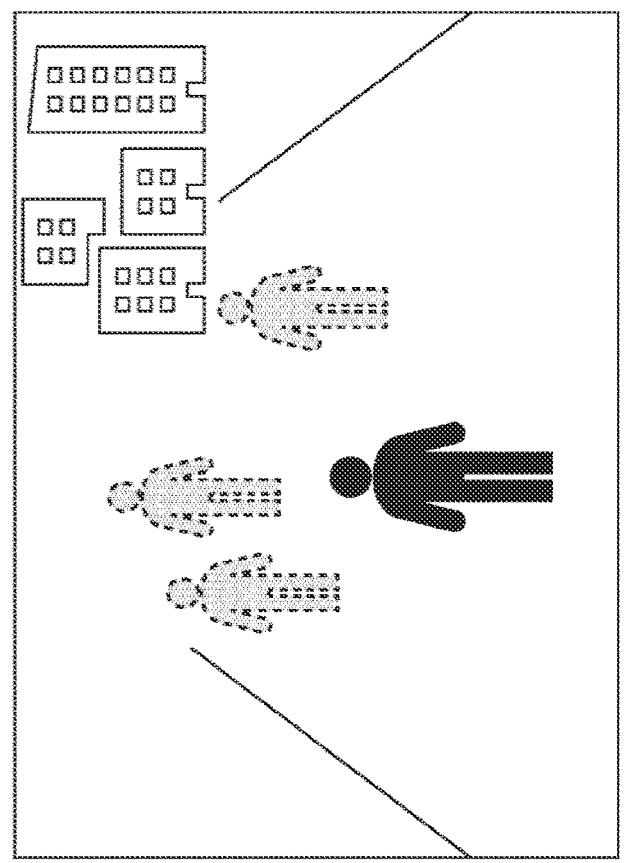
FIG. 6 is a diagram illustrating an example of a case where focus control and control of a shooting angle of view are not performed.

FIG. 6 is a diagram illustrating an example of a case where focus control and control of a shooting angle of view are not performed.

In a normal camera, focus control is performed on the basis of output from a phase difference sensor or contrast. In a case where a target to be focused cannot be designated from a robot, a human automatically focused by the camera is not necessarily a human that the robot is trying to watch when a plurality of humans at different distance from the robot exists as illustrated in FIG. 6.

In a case where a target to be focused is incorrect, a human to be watched is captured out of focus, and therefore, accuracy of recognizing a human to be followed will be lowered, for example. Furthermore, in a case where a robot is trying to recognize a signboard of a distant building while executing a task of searching surroundings, such an intention cannot be understood by the camera alone, and therefore, an image in which the signboard is out of focus is captured, by which recognition accuracy of the signboard is lowered.

By identifying a positional relation between the robot 1 and a target object on the basis of map information, controlling focus of the camera 11, and controlling a shooting angle of view, the target object that the robot 1 watches is in focus, and an image in which the target object appears large can be captured.

<Configuration Example of Robot>

Figure 7:
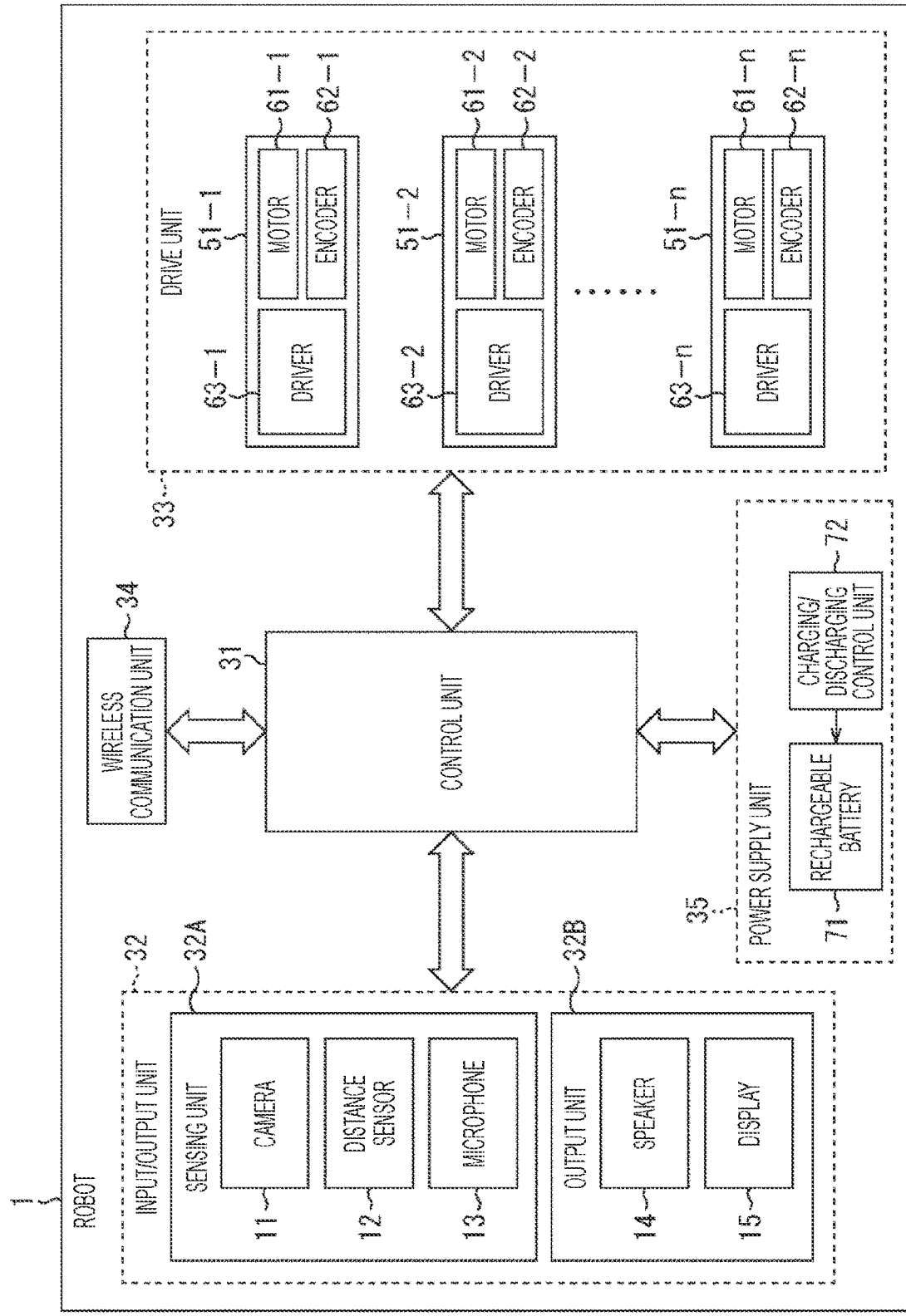
FIG. 7 is a block diagram illustrating a hardware configuration example of a robot.

FIG. 7 is a block diagram illustrating a hardware configuration example of the robot 1.

As illustrated in FIG. 7, the robot 1 is configured by an input/output unit 32, a drive unit 33, a wireless communication unit 34, and a power supply unit 35 being connected to a control unit 31.

The control unit 31 includes a computer having a central processing unit (CPU), a read only memory (ROM), a random access memory (RAM), a flash memory, or the like. The control unit 31 executes a predetermined program with the CPU and controls entire operation of the robot 1. The computer included in the control unit 31 is provided in a housing of the robot 1 and functions as a control device that controls operation of the robot 1.

For example, the control unit 31 generates map information as described with reference to FIG. 2 on the basis of distance information provided from a distance sensor 12 of the input/output unit 32. Furthermore, the control unit 31 selects a target object and calculates a distance to the selected target object, or the like, on the basis of the map information. The control unit 31 controls drive of the camera 11 on the basis of a distance calculated by using the map information, or the like.

Furthermore, the control unit 31 controls each unit of the drive unit 33 so as to take a predetermined action.

The input/output unit 32 includes a sensing unit 32A and an output unit 32B.

The sensing unit 32A includes the camera 11, the distance sensor 12, and a microphone (microphone) 13.

The camera 11 sequentially captures images of surroundings and outputs an image obtained by the image capturing to the control unit 31. As long as a characteristic of an object can be grasped, it is possible to provide a sensor of various types, such as an RGB sensor, a grayscale sensor, or an infrared sensor, as an image sensor of the camera 11.

The distance sensor 12 measures a distance to a target object and outputs distance information representing a measured distance to the control unit 31. As long as a distance can be measured, it is possible to provide a sensor of various kinds, such as an IR camera, a light detection and ranging (LIDAR) type sensor, a RADAR type sensor, as the distance sensor 12.

The microphone 13 detects environmental sound and outputs environmental sound data to the control unit 31.

The output unit 32B includes a speaker 14 and a display 15.

The speaker 14 outputs a predetermined sound such as synthetic voice, a sound effect, or BGM.

The display 15 includes, for example, an LCD, an organic EL display, or the like. The display 15 displays various kinds of images according to control by the control unit 31.

The drive unit 33 performs driving according to the control by the control unit 31 to achieve an action by the robot 1. The drive unit 33 includes a driving unit for driving wheels provided on a bottom surface of the housing, a driving unit provided on each joint, or the like.

Each driving unit includes a combination of a motor that rotates around an axis, an encoder that detects a rotation position of the motor, and a driver that adaptively controls the rotation position or rotational rate of the motor on the basis of output from the encoder. Hardware configuration of Robot 1 is fixed by the number of driving units, a position of the driving unit, or the like.

In an example in FIG. 7, driving units 51-1 to 51-n are provided. For example, the driving unit 51-1 includes a motor 61-1, an encoder 62-1 and a driver 63-1. The driving units 51-2 to 51-n have a configuration similar to configuration of the driving unit 51-1.

The wireless communication unit 34 is a wireless communication module such as a wireless LAN module, or a mobile communication module compatible with Long Term Evolution (LTE). The wireless communication unit 34 communicates with an external device such as a server on the Internet.

The power supply unit 35 supplies power to each unit in the robot 1. The power supply unit 35 includes a rechargeable battery 71 and a charging/discharging control unit 72 that manages a charging/discharging state of the rechargeable battery 71.

Figure 8:
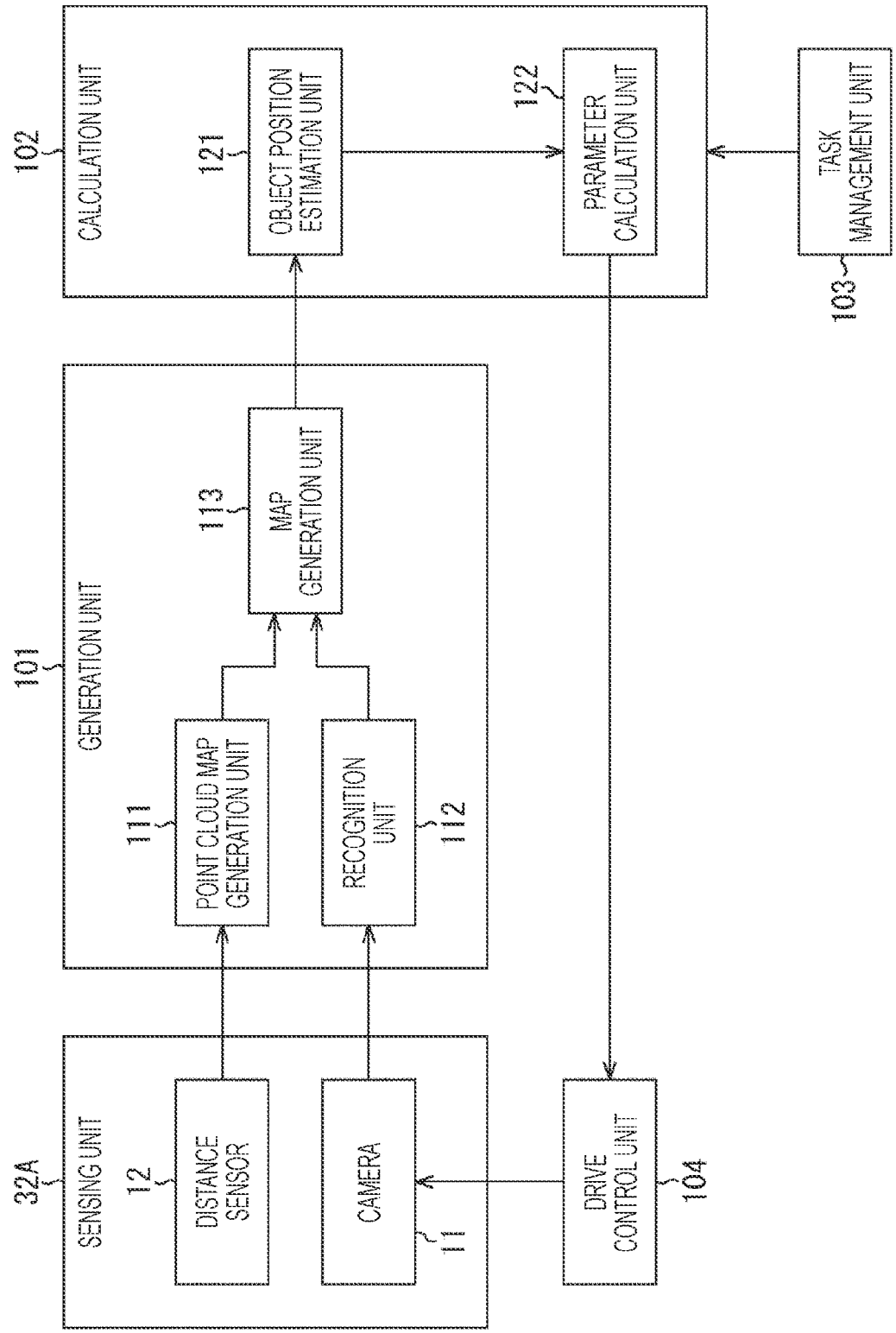
FIG. 8 is a block diagram illustrating a functional configuration example of a control unit.

FIG. 8 is a block diagram illustrating a functional configuration example of the control unit 31.

As illustrated in FIG. 8, the control unit 31 includes a generation unit 101, a calculation unit 102, a task management unit 103, and a drive control unit 104. At least a part of functional units illustrated in FIG. 8 is achieved by a predetermined program being executed by a CPU included the control unit 31. FIG. 8 also illustrates the camera 11 and distance sensor 12 of the sensing unit 32A.

The generation unit 101 includes a point cloud map generation unit 111, a recognition unit 112, and a map generation unit 113.

The point cloud map generation unit 111 generates a point cloud map with a position of the robot 1 as a reference by plotting, on a plane, a distance to each position on an object in surroundings, which is represented by distance information provided from the distance sensor 12. Each point plotted on the plane represents a position on the object. The point cloud map generation unit 111 outputs information about the point cloud map to the map generation unit 113.

The recognition unit 112 analyzes an image captured by the camera 11 and recognizes a type of an object shown in the image, or the like. For example, during execution of a task of tracking a specific human, the recognition unit 112 analyzes an image and recognizes a target human. The recognition unit 112 outputs information representing a recognition result to the map generation unit 113.

The map generation unit 113 identifies a type of each object on the point cloud map provided from the point cloud map generation unit 111 on the basis of the recognition result by the recognition unit 112. The map generation unit 113 generates map information including information about meaning of each object (semantic information), such as a type, and outputs the map information to the calculation unit 102.

The calculation unit 102 includes an object position estimation unit 121 and a parameter calculation unit 122.

The object position estimation unit 121 estimates a position of the target object on the basis of the map information generated by the map generation unit 113. For example, the task management unit 103 designates which object is to be targeted.

In a case where the target object is moving, the object position estimation unit 121 estimates a position of the target object at an image capturing timing of a next frame by the camera 11. The object position estimation unit 121 outputs information representing an estimation result of the position of the target object to the parameter calculation unit 122.

The parameter calculation unit 122 calculates various kinds of parameters for controlling the camera 11 on the basis of a relation between a position of the robot 1 and a position of the target object, which is estimated by the object position estimation unit 121. A parameter may be calculated on the basis of a relation between a position of the camera 11 and a position of the target object instead of a position of the robot 1. The parameter calculation unit 122 outputs the calculated parameter to the drive control unit 104 to drive the camera 11.

For example, the parameter calculation unit 122 calculates, as a focus control command value, a value for controlling focus so that the target object is in focus, on the basis of a distance from the robot 1 to the target object. Furthermore, the parameter calculation unit 122 calculates focal length for controlling a shooting angle of view so that the target object appears large.

An aperture value (f-number) of the camera 11 may be controlled on the basis of a size of a target object on the map. The parameter calculation unit 122 has information representing a correspondence between a size of a target object and an aperture value.

For example, in a case where a size of the target object is large, the parameter calculation unit 122 increases an aperture value to set a depth of field deep in order to capture an image in which an entire target object is in focus. Furthermore, in a case where a size of the target object is small, the parameter calculation unit 122 decreases an aperture value to set a depth of field shallow in order to capture an image in which the only target object is in focus.

By controlling an aperture value according to a size of the target object, it is possible to capture an image in which the target object is in focus and another object (non-target object) is out of focus. By capturing an image in which only the target object is in focus, it is possible to improve accuracy of image processing such as recognition processing.

The task management unit 103 manages a task of the robot 1. In a case where a task that uses an image recognition result is executed, the task management unit 103 selects a target object corresponding to the task. The target object is selected on the basis of the map information generated by the map generation unit 113, for example. The target object may be selected on the basis of an image captured by the camera 11. The task management unit 103 outputs information for designating a target object to the calculation unit 102.

The drive control unit 104 controls drive of the camera 11 according to a parameter provided from the parameter calculation unit 122. That is, in a case where a focus control command value is provided from the parameter calculation unit 122, the drive control unit 104 drives a focus lens constituting a lens of the camera 11 and controls the focus so that the target object is in focus.

In a case where focal length information is provided from the parameter calculation unit 122, the drive control unit 104 drives the zoom lens of the camera 11 in a zoom direction or a telephoto direction to control a shooting angle of view.

In a case where aperture value information is provided from the parameter calculation unit 122, the drive control unit 104 controls aperture of the lens of the camera 11.

<Operation of Robot>

Here, operation of the robot 1 having the above configuration will be described.

First, processing by the robot 1 that generates map information will be described with reference to the flowchart in FIG. 9.

Figure 9:
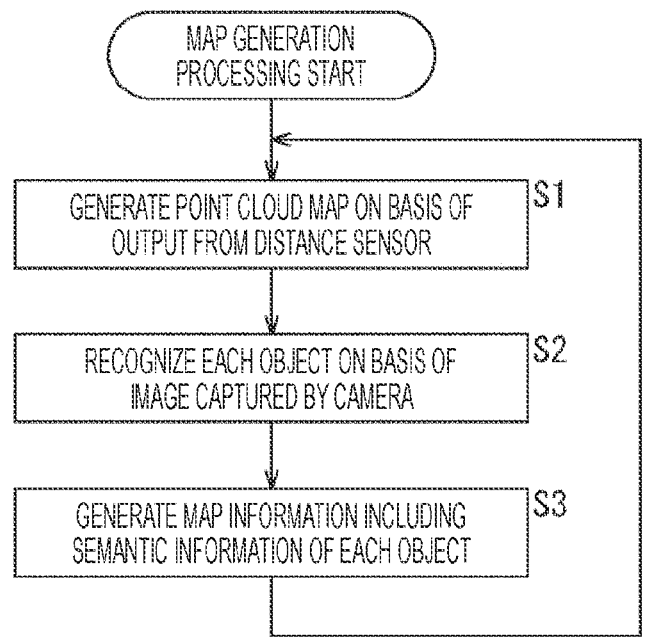
FIG. 9 is a flowchart for describing map information generation processing by the robot.

Processing in FIG. 9 is performed, for example, before executing a predetermined task that uses an image recognition result.

In step S1, the point cloud map generation unit 111 generates a point cloud map with a position of the robot 1 as a reference on the basis of distance information provided from the distance sensor 12.

In step S2, the recognition unit 112 recognizes each object shown in an image captured by the camera 11.

In step S3, the map generation unit 113 identifies a type of each object on a point cloud map generated by the point cloud map generation unit 111 on the basis of a recognition result by the recognition unit 112, and generates map information including semantic information of each object.

Thereafter, the processing returns to step S1 and the above processing is repeated. By repeating each processing, the map information is updated sequentially.

Figure 10:
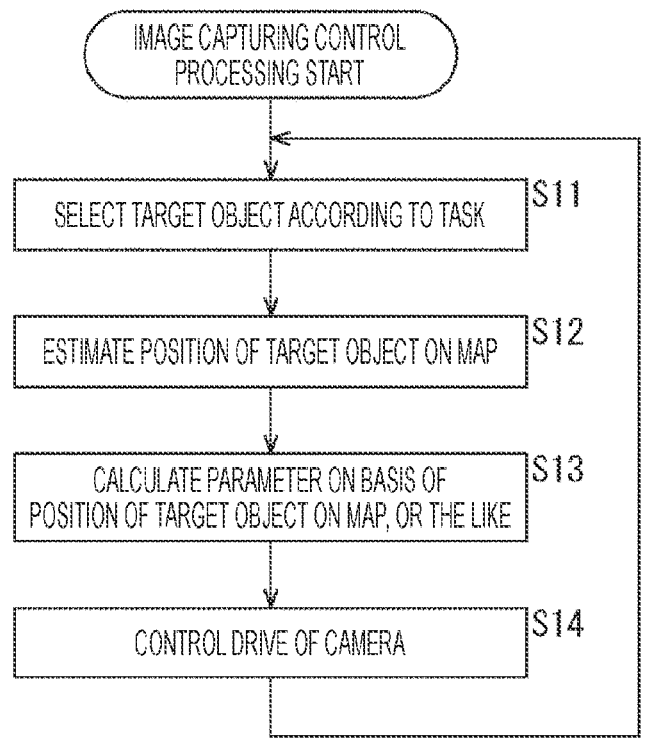
FIG. 10 is a flowchart for describing image capturing control processing by the robot.

Next, processing by the robot 1 that controls image capturing by the camera 11 will be described with reference to the flowchart in FIG. 10.

In step S11, the task management unit 103 selects a target object according to a task of the robot 1.

In step S12, the object position estimation unit 121 estimates a position of the target object on the map on the basis of the map information generated by the map generation unit 113.

In step S13, the parameter calculation unit 122 calculates various kinds of parameters for controlling the camera 11 on the basis of a relation between the position of the robot 1 and the position of the target object estimated by the object position estimation unit 121.

In step S14, the drive control unit 104 controls drive of the camera 11 according to a parameter calculated by the parameter calculation unit 122. With this arrangement, focus, a shooting angle of view, and aperture value of the camera 11 are controlled as described above. Thereafter, the processing returns to step S11, and the above processing is repeated.

With the above processing, the robot 1 can focus on a target object with high accuracy even in a situation where a plurality of objects exists at different distances, in which focus has been difficult to be adjusted with autofocus based on optical control. Because the robot 1 performs recognition processing, or the like, on the basis of an image in which the target object is in focus, it is possible to recognize the target object with high accuracy.

Furthermore, because the map information includes information representing meaning of each object, the robot 1 can refer to such map information and select an appropriate object corresponding to the task, as a target object.

<Application Example>

The control of the camera 11 using map information is also performed when a task of searching surroundings is executed. During execution of the task of searching surroundings, a target object is sequentially switched to perform focus control, or the like.

Figure 11:
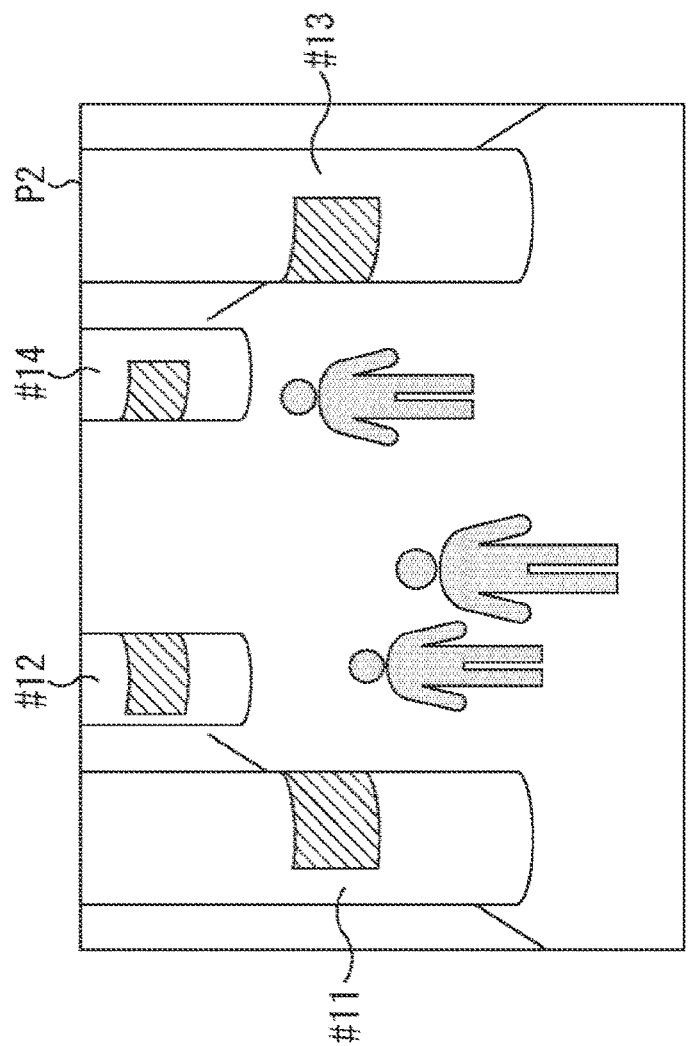
FIG. 11 is a diagram illustrating an example of an image captured by a camera.

FIG. 11 is a diagram illustrating an example of an image captured by the camera 11.

Here, it is assumed that the robot 1 is executing a task of searching surroundings in a building, or the like. In an example in FIG. 11, pillars #11 to #14 having a columnar shape are shown in an image P2 along with humans. A signboard, a poster, or the like, is attached to a shaded area on a surface of each of the pillars #11 to #14.

The task of searching surroundings is proceeded by identifying content of signboards, or the like, attached to the pillars #11 to #14 on the basis of an image captured by the camera 11 to recognize surroundings.

Figure 12:
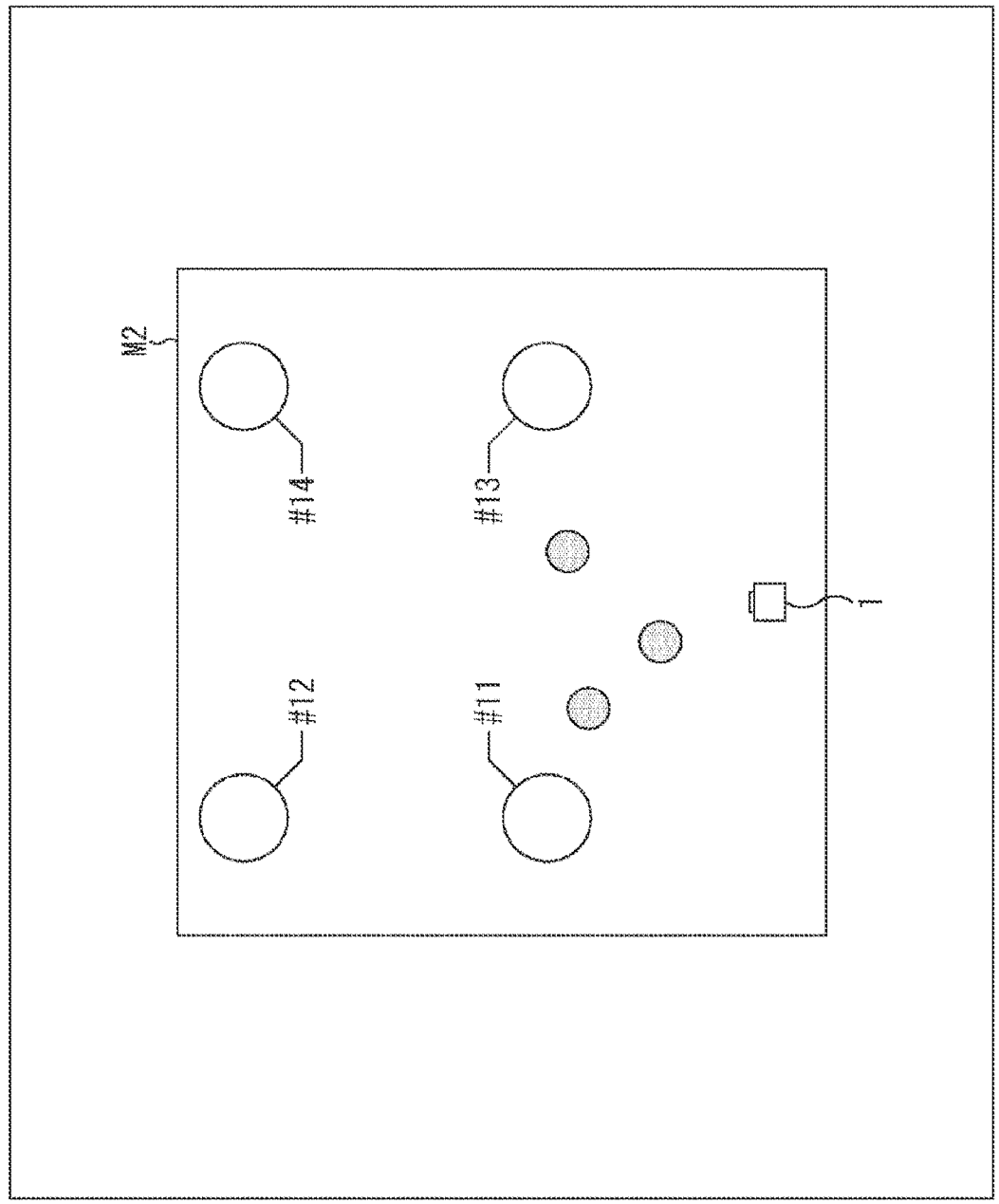
FIG. 12 is a diagram illustrating an example of map information.

FIG. 12 is a diagram illustrating an example of map information.

In map information M2 generated in a situation as illustrated in FIG. 11, the humans are arranged and the pillars #11 to #14 are arranged as illustrated in FIG. 12. In FIG. 12, the three colored circles represent the humans.

In this case, in the robot 1, each of the pillars #11 to #14 is sequentially selected as a target object, and a distance from the robot 1 to each target object is calculated on the basis of the map information M2.

Furthermore, in the robot 1, focus of the camera 11 is controlled on the basis of a distance calculated by using the map information M2. Furthermore, control of a shooting angle of view or control of an aperture value is performed as appropriate.

Figure 13:
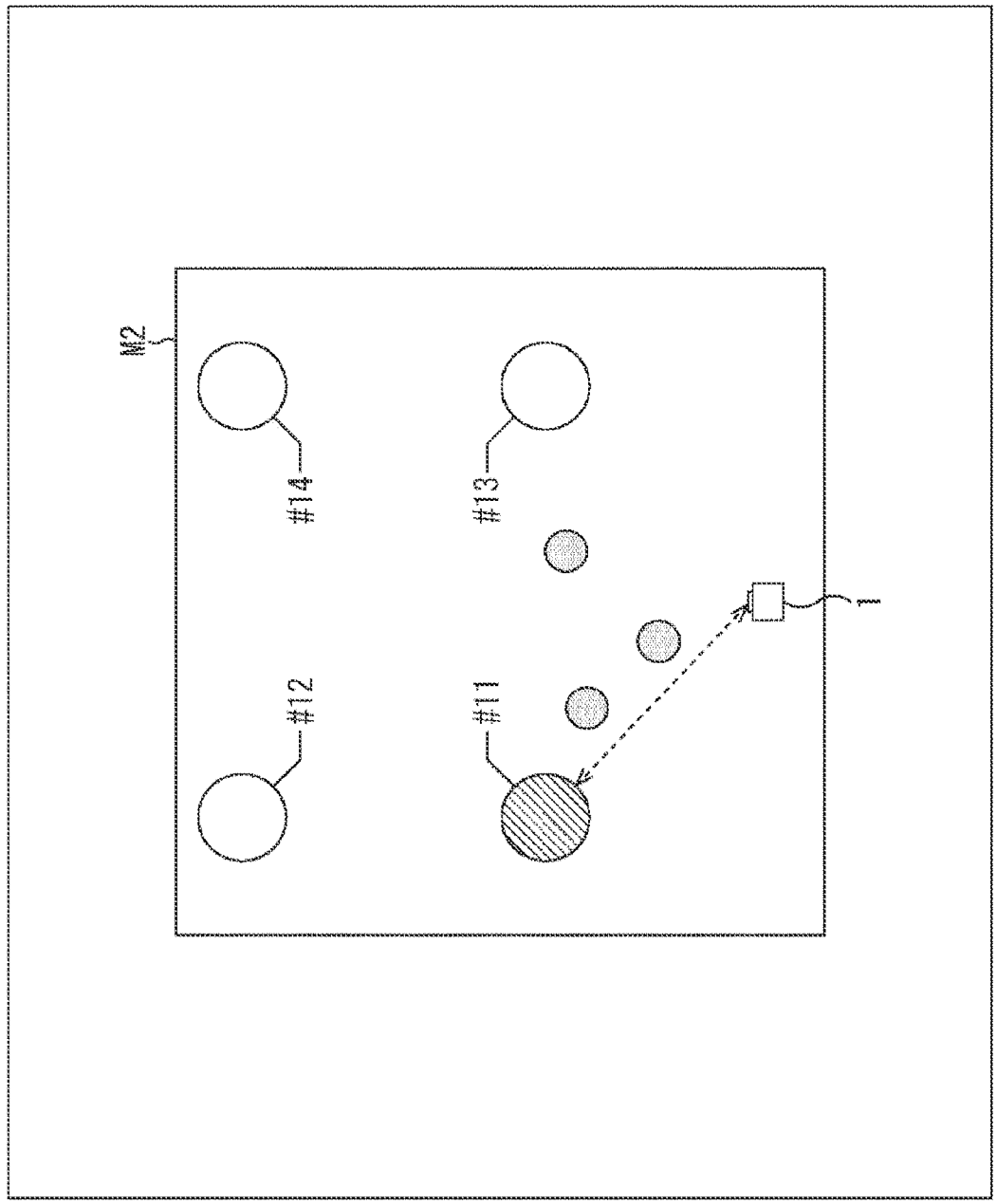
FIG. 13 is a diagram illustrating an example of focus control.

FIG. 13 is a diagram illustrating an example of focus control.

In a case where the pillar #11 is selected as a target object, focus is controlled on the basis of a distance to the pillar #11, as illustrated by a dashed arrow in FIG. 13, and an image is captured in that state. In an image captured by the camera 11, a signboard, or the like, attached to the pillar #11 is in focus and appears large.

Such image capturing is performed by switching a target object in an order of, for example, the pillar #12, the pillar #13, and the pillar #14.

By the above processing, it is possible to capture an image in which each pillar is in focus, and it is possible to recognize content of a signboard, or the like, attached to each pillar with high accuracy.

Thus, control of the camera 11 based on a positional relation between the robot 1 and each target object can be applied to various kinds of tasks.

For example, in a case where the robot 1 is a vehicle equipped with an automatic driving function, capturing an image to be used for recognition of a traffic light or sign installed on a road is controlled on the basis of a positional relation between the robot 1 and each target object, which is represented by map information, during execution of a task of moving to a destination.

For example, by capturing an image in which an obstacle is in focus, accuracy of recognizing the obstacle can be improved, by which the obstacle can be avoided more appropriately. A dangerous obstacle may be selected on the basis of map information, and moving route may be set to preferentially avoid such a dangerous obstacle.

For example, in a case where the Robot 1 is a drone, a flying bird, an electric wire, or the like, is selected as an obstacle. Furthermore, in a case where the robot 1 is a vehicle, a human, a dog, a vehicle traveling in front, or the like, is selected as an obstacle.

In a case where each object is a moving object, a degree of danger of each object may be judged by identifying moving speed on the basis of map information and regarding an object moving at a high speed as a dangerous object.

<Modifications>

Although a case of controlling drive of the camera 11 has been described, drive of another device may be controlled on the basis of a positional relation between the robot 1 and a target object represented by map information. For example, a characteristic of the microphone 13 can be controlled on the basis of a positional relation between the robot 1 and the target object.

Figure 14:
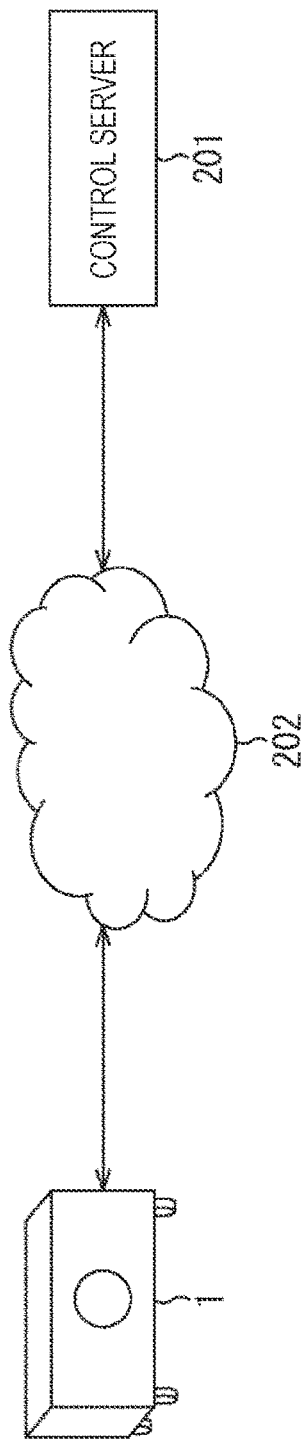
FIG. 14 is a diagram illustrating a configuration example of a control system.

FIG. 14 is a diagram illustrating a configuration example of a control system.

A control system in FIG. 14 is configured by the robot 1 and a control server 201 being connected via a network 202 such as the Internet. The robot 1 and the control server 201 communicate with each other via the network 202.

In the control system in FIG. 14, processing by the robot 1 as described above is performed by the control server 201, which is an external device of the robot 1. That is, each of functional units, which are the generation unit 101, the calculation unit 102, and the task management unit 103 in FIG. 8 is achieved in the control server 201 by a predetermined program being executed.

The control server 201 generates map information as described above on the basis of an image and distance information transmitted from the robot 1. Various kinds of data, such as an image captured by the camera 11 or distance information detected by the distance sensor 12, are repeatedly transmitted from the robot 1 to the control server 201.

The control server 201 calculates various kinds of parameters on the basis of a positional relation between the robot 1 and the target object on a map, and transmits the parameters to the robot 1. The robot 1 drives the camera 11 according to the parameters transmitted from the control server 201. The control server 201 functions as a control device that controls action of the robot 1.

Thus, a control device that controls an action of the robot 1 may be provided as an external device of the robot 1.

Configuration Example of Computer

The above-described series of processing can be executed by hardware or can be executed by software. In a case where a series of processing is executed by software, a program constituting the software is installed on a computer incorporated in dedicated hardware, a general-purpose personal computer, or the like, from a program recording medium.

Figure 15:
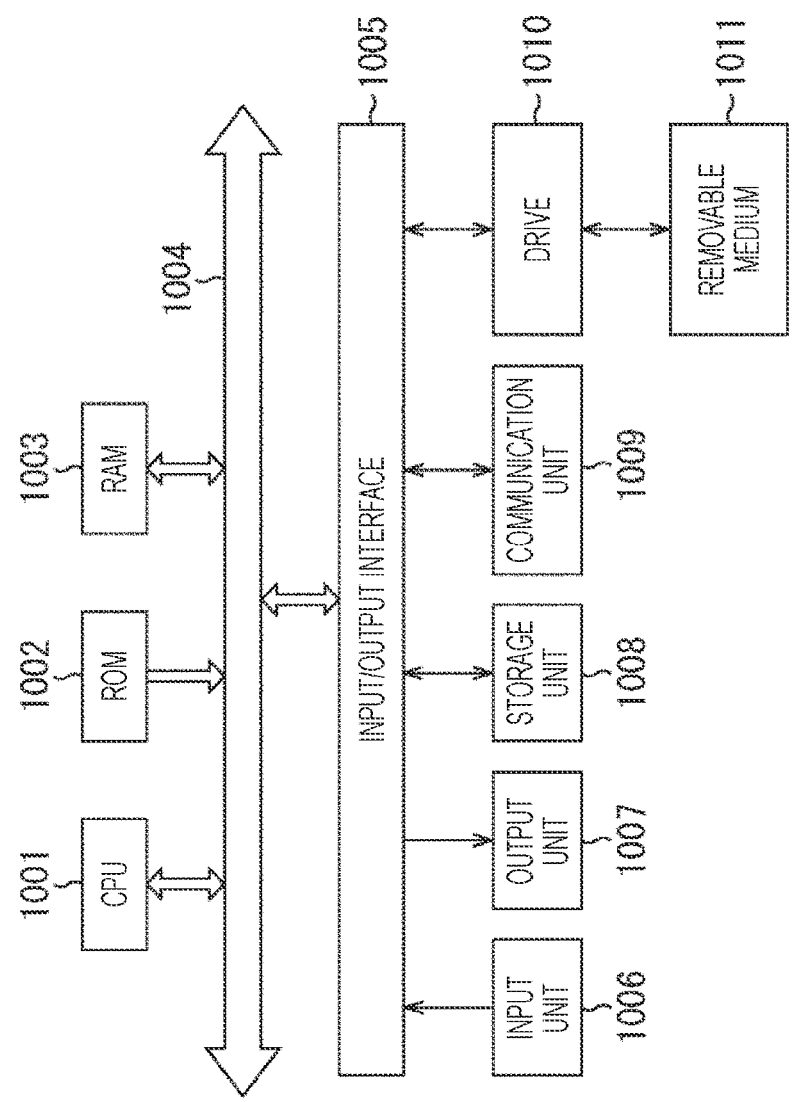
FIG. 15 is a block diagram illustrating a configuration example of hardware of a computer.

FIG. 15 is a block diagram illustrating a configuration example of hardware of a computer that executes the series of processing described above with a program. The control server 201 in FIG. 14 also has a configuration similar to the configuration illustrated in FIG. 15.

A central processing unit (CPU) 1001, a read only memory (ROM) 1002, and a random access memory (RAM) 1003 are mutually connected by a bus 1004.

Moreover, an input/output interface 1005 is connected to the bus 1004. To the input/output interface 1005, an input unit 1006 including a keyboard, a mouse, or the like, and an output unit 1007 including a display, a speaker, or the like, are connected. Furthermore, to the input/output interface 1005, a storage unit 1008 including a hard disk, a non-volatile memory, or the like, a communication unit 1009 including a network interface, or the like, and a drive 1010 that drives a removable medium 1011 are connected.

In the computer configured as above, the series of processing described above is executed by the CPU 1001 loading, for example, a program stored in the storage unit 1008 to the RAM 1003 via the input/output interface 1005 and the bus 1004 and executing the program.

A program executed by the CPU 1001 is provided by, for example, being recorded in the removable medium 1011 or via a wired or wireless transmission medium such as a local area network, the Internet, or digital broadcasting, and is installed in the storage unit 1008.

Note that, the program executed by the computer may be a program that is processed in time series in an order described in this specification, or a program that is processed in parallel or at a necessary timing such as when a call is made.

In the present specification, a system means a set of a plurality of components (devices, modules (parts), or the like), and it does not matter whether or not all the components are in the same housing. Therefore, a plurality of devices housed in separate housings and connected via a network, and one device in which a plurality of modules is housed in one housing are both systems.

The effects described herein are only examples, and not limited thereto. Additional effects may also be obtained.

An embodiment of the present technology is not limited to the above-described embodiments, and various changes can be made without departing from the scope of the present technology.

For example, the present technology can have a configuration of cloud computing in which one function is shared and processed jointly by a plurality of devices via a network.

Furthermore, each step described in the above-described flowcharts can be executed by one device, or can be executed by being shared by a plurality of devices.

Moreover, in a case where a plurality of pieces of processing is included in one step, the plurality of pieces of processing included in the one step can be executed by being shared by a plurality of devices, in addition to being executed by one device.

Example of Configuration Combination

The present technology can have the following configurations.

(1)

A control device including a map generation unit that generates a map including a target object existing around a moving object on the basis of output from a sensor provided on the moving object, and a control unit that controls drive of a camera provided on the moving object that captures an image of the target object on the basis of a relation between a position of the target object and position of the moving object on the map.

(2)

The control device according to (1), the control device further including an estimation unit that estimates a position of the target object in move on the map, in which the control unit controls drive of the camera so as to track and capture an image of the target object on the basis of an estimated position.

(3)

The control device according to (1) or (2), in which the control unit performs focus control of the camera on the basis of a distance from the moving object to the target object, the distance being identified on the basis of the map.

(4)

The control device according to any one of (1) to (3), in which the control unit controls focal length of the camera on the basis of a distance from the moving object to the target object, the distance being identified on the basis of the map.

(5)

The control device according to any one of (1) to (4), in which the control unit controls an aperture value of the camera on the basis of a size of the target object, the size being identified on the basis of the map.

(6)

The control device according to any one of (1) to (5), in which the control unit controls drive of the camera so as to switch the target object subjected to image capturing according to a task that the moving object executes.

(7)

The control device according to any one of (1) to (6), the control device being provided in a housing of the moving object.

(8)

A control method including, by a control device, generating a map including a target object existing around a moving object on the basis of output from a sensor provided on the moving object, and controlling drive of a camera provided on the moving object that captures an image of the target object on the basis of a relation between a position of the target object and position of the moving object on the map.

(9)

A program for causing a computer to execute processing of generating a map including a target object existing around a moving object on the basis of output from a sensor provided on the moving object, and controlling drive of a camera provided on the moving object that captures an image of the target object on the basis of a relation between a position of the target object and position of the moving object on the map.

REFERENCE SIGNS LIST

1 Robot
31 Control unit
32 Input/output unit
33 Drive unit
34 Wireless communication unit
35 Power supply unit
101 Generation unit
102 Calculation unit
103 Task management unit
104 Drive control unit
111 Point cloud map generation unit
112 Recognition unit
113 Map generation unit
121 Object position estimation unit
122 Parameter calculation unit
201 Control server
202 Network

The invention claimed is:

1. A control device, comprising:
a central processing unit (CPU) configured to:
generate a map including a target object existing around a moving object based on output from a sensor on the moving object;
control drive of a camera on the moving object based on a relation between a position of the target object and a position of the moving object on the map, wherein the camera captures an image of the target object; and control an aperture value of the camera based on a size of the target object, wherein the size is based on the map.

2. The control device according to claim 1, wherein the CPU is further configured to:

estimate the position of the target object in move on the map; and control the drive of the camera based on the estimated position of the target object in move; and track and capture the image of the target object based the controlled drive of the camera.

3. The control device according to claim 1, wherein the CPU is further configured to:

calculate a distance from the moving object to the target object based on the map; and perform focus control of the camera based on the calculated distance from the moving object to the target object.

4. The control device according to claim 1, wherein the CPU is further configured to:

calculate a distance from the moving object to the target object based on the map; and control a focal length of the camera based on the calculated distance from the moving object to the target object.

5. The control device according to claim 1, wherein the CPU is further configured to:

switch the target object subjected to image capture based on a task that the moving object executes; and control the drive of the camera based on the switch of the target object.

6. The control device according to claim 1, wherein the control device is in a housing of the moving object.

7. A control method, comprising:

generating, by a control device, a map including a target object existing around a moving object based on output from a sensor on the moving object;

controlling, by the control device, drive of a camera on the moving object based on a relation between a position of the target object and a position of the moving object on the map, wherein the camera captures an image of the target object; and controlling an aperture value of the camera based on a size of the target object, wherein the size is based on the map.

8. A non-transitory computer-readable medium having stored thereon computer-executable instructions, that when executed by a processor of an information recording device, cause the processor to execute operations, the operations comprising:

generating a map including a target object existing around a moving object based on output from a sensor on the moving object;

controlling drive of a camera on the moving object based on a relation between a position of the target object and a position of the moving object on the map, wherein the camera captures an image of the target object; and controlling an aperture value of the camera based on a size of the target object, wherein the size is based on the map.

9. A control device, comprising:

a central processing unit (CPU) configured to:

generate a map including a target object existing around a moving object based on output from a sensor on the moving object;

control drive of a camera on the moving object based on a relation between a position of the target object and a position of the moving object on the map, wherein the camera captures an image of the target object;

calculate a distance from the moving object to the target object based on the map; and control a focal length of the camera based on the calculated distance from the moving object to the target object.

* * * * *